Patented May 5, 1931

1,803,855

UNITED STATES PATENT OFFICE

OSKAR KRAMER AND LEOPOLD BUB, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF CARBON

No Drawing. Application filed July 9, 1927, Serial No. 204,659, and in Germany July 13, 1926.

It is already known that carbon monoxid is decomposed into carbon and carbon dioxid, by contact with substances such as finely divided iron, cobalt, nickel or the like, which metals are hereinafter referred to for the sake of brevity as metals of the iron group, at high temperatures.

This process may be carried out in practice for example by introducing the solid contact substance together with carbon monoxid or a gas containing the same into a highly heated reaction vessel, the carbon separates on the contact substance and can be withdrawn only together with the latter, so that it is obtained in a highly impure state.

We have now found that the decomposition of carbon monoxid or gases containing the same into carbon and carbon dioxid may be effected in a continuous and simple manner by adding small quantities, preferably for example 0.1 to 0.2 per cent by volume, of iron carbonyl vapor to the reaction gas. The mixture of gas and carbonyl is preferably introduced under pressure, into the reaction vessel which is heated to a high temperature, such as 400° C.

The rate of flow may be regulated in such a way that the resulting carbon passes over, without settling in the reaction vessel, into a collector situated directly underneath the said vessel, and from which it is withdrawn.

The effluent gas, which still contains considerable amounts of carbon monoxid, can be returned, in circulation, to the furnace after the elimination of the carbon dioxid and the addition of the necessary amount of iron carbonyl, or it may be subjected to the treatment hereinbefore described in a second apparatus.

The process may also be carried out by injecting suitable quantities of the liquid carbonyl into the reaction vessel, either continuously or at certain intervals. The iron carbonyl may also be replaced by other metal carbonyls, or organic compounds of metals of the iron group.

The carbon obtained as hereinbefore described may advantageously be used owing to its state of fine distribution for all purposes for which soot or lamp black can be employed.

The following example will further illustrate the nature of the said invention but the invention is not limited to this example.

Example

Carbon monoxid, containing an admixture of 0.2 per cent by volume of iron carbonyl, is passed, at a temperature of 400° C. and under a pressure of 100 atmospheres, through a high pressure furnace. 47 per cent of the gas is thereby decomposed into carbon and carbon dioxid. The effluent gas is freed from the carbon dioxid by washing with water under pressure, and, after an addition of 0.2 per cent by volume of iron carbonyl, is introduced into another furnace. The resulting carbon contains about 2 per cent of iron.

What we claim is:

1. In the manufacture of carbon by the thermal decomposition of gases containing carbon monoxid, the step of adding to the gases about 0.1 to 0.2 per cent by volume of a vaporized carbonyl compound of a metal of the iron group.

2. In the manufacture of carbon by the thermal decompositon of gases containing carbon monoxid, the step of adding to the gases between 0.1 and 0.2 percent by volume of iron carbonyl vapor.

3. In the manufacture of carbon by the thermal decomposition of gases containing carbon monoxid, the steps of adding to the gases between 0.1 and 0.2 per cent by volume of iron carbonyl vapor and passing the gases under a pressure of about 100 atmospheres through a high pressure furnace at about 400° C.

In testimony whereof we have hereunto set our hands.

OSKAR KRAMER.
LEOPOLD BUB.